Figure 1:
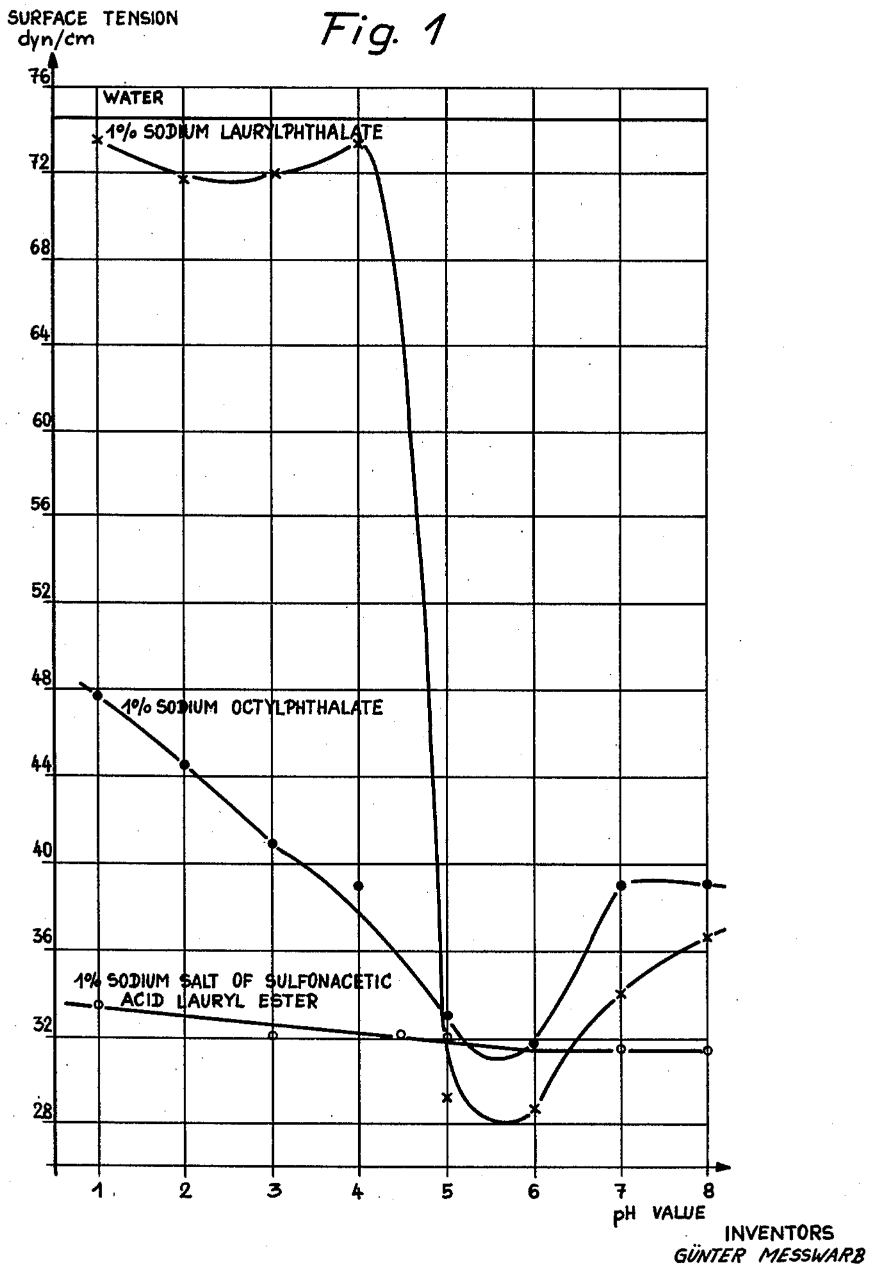

May 4, 1965 G. MESSWARB ET AL 3,182,044

POLYMERIZATION OF UNSATURATED POLYMERIZABLE COMPOUNDS

Filed Feb. 20, 1962 2 Sheets-Sheet 1

INVENTORS
GÜNTER MESSWARB
LUDWIG ORTHNER
RUDOLF REUBER
MAX GROSSMANN

BY

Curtis, Morris & Safford

ATTORNEYS

May 4, 1965 G. MESSWARB ET AL 3,182,044

POLYMERIZATION OF UNSATURATED POLYMERIZABLE COMPOUNDS

Filed Feb. 20, 1962 2 Sheets-Sheet 2

INVENTORS
Günter Messwarb
Ludwig Orthner
Rudolf Reuber
Max Grossmann
BY
Curtis Morris + Safford
ATTORNEYS 3,182,044

POLYMERIZATION OF UNSATURATED POLYMERIZABLE COMPOUNDS

Günter Messwarb, Kelkheim, Taunus, and Ludwig Orthner, Rudolf Reuber, and Max Grossmann, Frankfurt am Main, Germany, assignors to Farbwerke Hoechst Aktiengesellschaft vormals Meister Lucius & Brüning, Frankfurt am Main, Germany, a corporation of Germany Filed Feb. 20, 1962, Ser. No. 174,432
Claims priority, application Germany, Jan. 5, 1956, F 19,237; Feb. 8, 1956, F 19,472
11 Claims. (Cl. 260—87.1)

The present invention relates to an improved process for the polymerization of ethylenically unsaturated monomers. More especially the invention relates to an improved process for the polymerization of vinyl and/or vinylidene monomers in an aqueous emulsion.

This application is a continuation-in-part application of co-pending applicaton Serial No. 637,859, filed February 4, 1957, by Günter Messwarb et al. for "Polymerization of Unsaturated Polymerizable Compounds," which in turn is a continuation-in-part application of patent application Serial No. 630,746, filed December 27, 1956, by Günter Messwarb et al. for "Polymerization of Unsaturated Polymerizable Compounds," both now abandoned.

It is known to prepare emulsion or suspension polymers from polymerizable unsaturated compounds by emulsifying a monomer or a mixture of monomers in water, or emulsifying a solution of a monomer in a solvent immiscible with water, such as hydrocarbons, and then polymerizing the monomer in the emulsions thus obtained in the presence of a catalyst.

Many of the emulsion polymerization processes heretofore known have the disadvantage that the surface active compounds (emulsifiers or dispersing agents) used for emulsifying the monomer and, if desired, also the resulting polymer, can be removed only incompletely from the polymer even by very thorough washing. The emulsifier residues adhering to the polymer, however, often considerably impair its quality.

It is already known to use phthalic acid diesters as emulsifiers in polymerization. These diesters can be hydrolyzed after the polymerization, whereby the emulsifying action ceases. However, the known phthalic acid diesters can be adequately hydrolyzed for industrial purposes only by a prolonged treatment at a temperature above 60° C. as will become evident in the tests described below.

To ensure a mild treatment of the polymers, which is essential to preserve the quality of the product, it is the purpose of the present invention to provide an emulsifier that can be hydrolyzed at a temperature below 60° C., and preferably at room temperature (20–25° C.).

It is another purpose of the invention to provide a method for emulsion polymerization that is suitable to realize all the advantageous properties of said emulsifier.

It has been found that ethylenically unsaturated monomers can be polymerized in an aqueous emulsion by emulsifying said monomers with the use of an emulsifier comprising an ester of an aliphatic alcohol having 6 to 25, preferably 8 to 14, carbon atoms and a carboxylic acid having 2 to 3 carbon atoms and bearing as a substituent a hydrophilic group, carrying out the polymerization in known manner in a weakly alkaline or acid aqeous emulsion, e.g. within a pH range between 2 and 8, and subsequently hydrolyzing the emulsifier present in the reaction mixture to form non-surface-active constituents by shifting the pH value of the reaction mixture into the alkaline, or more strongly alkaline, region. As emulsifiers or dispersing agents such materials as are sensitive to strongly alkaline pH values but sufficiently stable in the weakly alkaline to acid pH range are used for carrying out the emulsion polymerization. Such types of emulsifiers will be designated herein as "hydrolyzable emulsifiers" because they are susceptible to hydrolysis by chemical reaction resulting in the breakage of an ester linkage that is present in the emulsifier molecule. The "hydrolyzable emulsifiers" accordingly possess as a common feature an ester linkage connecting a hydrophilic acid portion to an aliphatic hydrocarbon chain forming the alcoholic portion of the ester molecule. These compounds can be defined by the formula $$X—(CH_2)_n—CO—O—R$$

wherein X is a hydrophilic group such as a sulfonic acid group, a phosphonic acid group, or a tertiary alkyl-ammonium halide group, R is an aliphatic hydrocarbon chain of 6 to 25, preferably 8 to 14, carbon atoms, and *n* is an integer from 1 to 2.

The sulfonic acid group mentioned above is defined by the formula

in which Z is hydrogen. It is, however, within the scope of the invention that water-soluble salts of the corresponding sulfonic acids are used. Accordingly, Z can mean, instead of hydrogen, an alkali metal radical, particularly a sodium or potassium radical. The same holds true when X is a phosphonic acid group

wherein each Z may either mean hydrogen or one of the aforementioned metal radicals.

The tertiary alkyl ammonium halide group can be defined by the formula

wherein R′, R″, and R‴ are each a saturated aliphatic or cycloaliphatic hydrocarbon radical having up to 6 carbon atoms preferably not more than 2 carbon atoms, e.g. a methyl, ethyl, n- or isopropyl, n-, iso- or tert.-butyl, amyl, hexyl, cyclopentyl, or cyclohexyl radical, and Hal means a halogen atom, preferably bromine or more preferably chlorine.

The radical R is, as pointed out above, an aliphatic hydrocarbon radical having 6 to 25, preferably 8 to 14, carbon atoms, saturated straight chain radicals being preferred. Accordingly, R may be an n-hexyl, n-heptyl, n-octyl, n-nonyl, n-decyl, n-undecyl, or n-dodecyl (i.e. lauryl) radical as well as a higher aliphatic hydrocarbon radical such as a stearyl, oleyl, or palmityl radical.

Suitable emulsifiers that can be used according to the invention are, for instance, the esters formed by an aliphatic alcohol as defined above and, as the acid portion, a halide of a trialkyl ammonium substituted carboxylic acid, said acid having 2 to 3 carbon atoms in addition to those of the alkyl group of the trialkyl ammonium substituent. Such carboxylic acids are, for instance, the chloride of trimethyl ammonium acetic acid having the formula

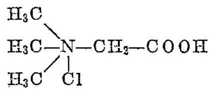

the corresponding bromide, the corresponding triethyl compounds, or the chlorides and bromides of trialkyl ammonium propionic acids. Further compounds that can be used as emulsifiers according to the invention are the esters of an aliphatic alcohol having 6 to 25 carbon atoms and a carboxylic acid substituted by a phosphonic acid group or by a sulfonic acid group. Examples for such acid components are phospho-acetic acid of the formula $$H_2O_3P—CH_2—COOH$$

sulfo-acetic acid of the formula $$HO_3S—CH_2—COOH$$

phospho-propionic acid, and sulfo-propionic acid, as well as the salts of those acids wherein the hydrogen atoms of the sulfo- and phospho-groups respectively are replaced by alkali metal atoms.

The accompanying drawing shows diagrammatically the result of some tests carried out in order to estimate the dependency on the pH value of the surface tension of some solutions containing an emulsifier according to the invention and some other solutions containing emulsifiers known in the art for the purpose of comparison. Furthermore, test results showing the speed of hydrolysis of a compound used as emulsifiers according to the invention are shown in comparison with some known emulsifiers.

Thus in FIGURE 1 the surface tension of 1% aqueous solutions of some emulsifiers is plotted against the pH value of the solution.

Figure 2:
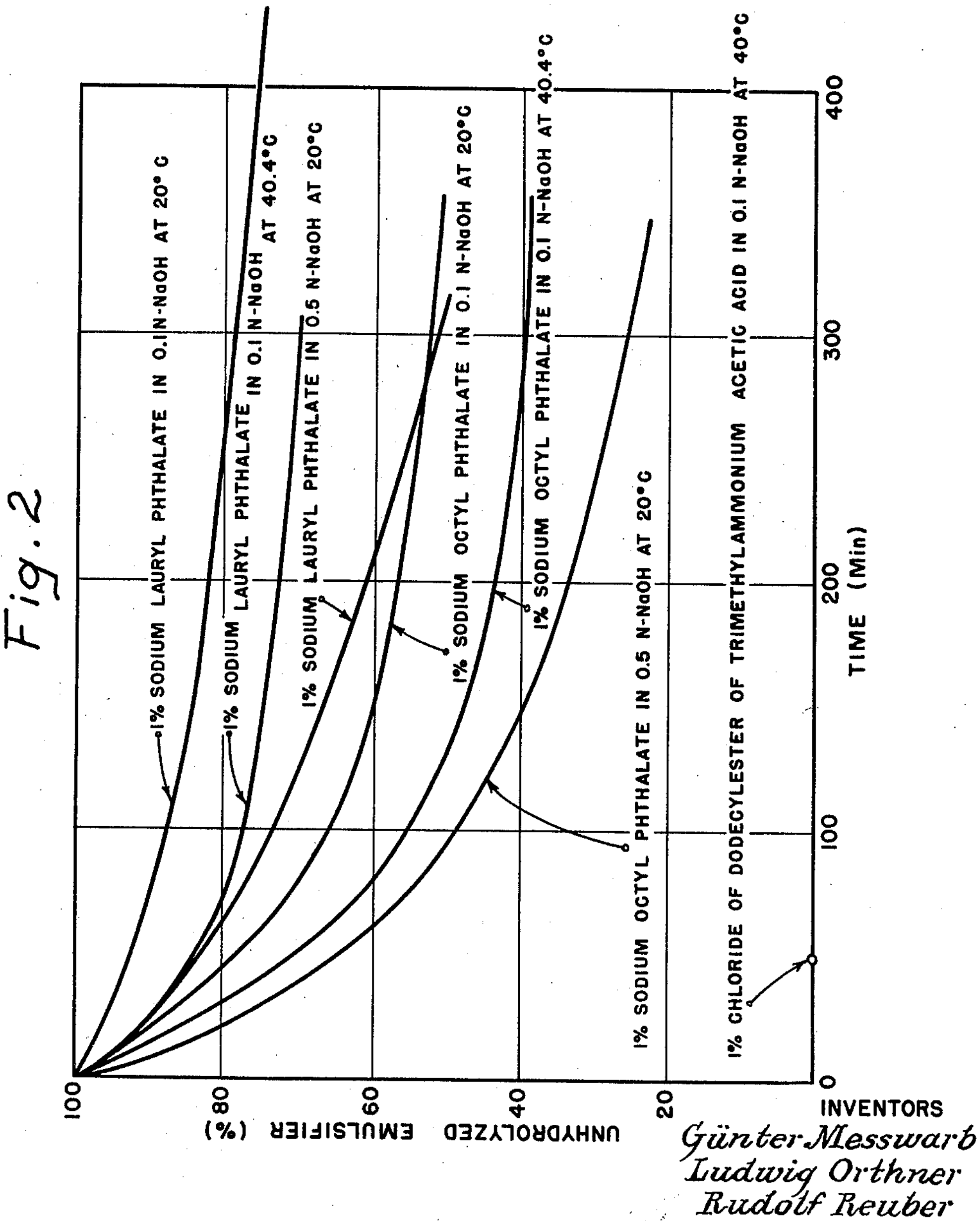

In FIGURE 2 the amount of unhydrolyzed emulsifier in various alkaline aqueous solutions is plotted against the time.

In the tests, the results of which are shown in FIGURE 1, the surface tension of 1% solutions of sodium lauryl phthalate, sodium octyl phthalate (both being known in the art) and the sodium salt of sulpho-acetic acid lauryl ester (an emulsifier according to the invention) was measured at various pH values using a tensiometer of the Du Nouy type (see C. E. G. Sumner, "The Theory of Emulsions," 5th edition, London, 1954, pages 624/625). The pH value of the solutions was adjusted in each case with very small amounts of hydrochloric acid solution or sodium hydroxide solution in order to use only a very small amount of electrolyte and thus to avoid any salt effect on the surface tension.

The dependency of the surface tension of the respective solution on the pH value is illustrated diagrammatically in FIGURE 1 of the drawing. The curves show that a 1% solution of sodium lauryl phthalate has substantially the same surface tension as water the curve of which is also shown for purpose of comparison in the diagram, as far as pH values of 4 and less are concerned. Also a 1% solution of sodium octyl phthalate possesses in this pH range a strongly reduced surface active effect. The two solutions exhibit a surface tension of less than 35 dyn./cm. only in a very narrow range between pH 5 and pH 7. Contrary thereto, a 1% solution of the sodium salt of the sulpho-acetic acid lauryl ester has essentially an independent surface tension of 31 to 34 dyn./cm. in the range between pH 1 and pH 8. The test results establish that sodium octyl phthalate and sodium lauryl phthalate as emulsifier can be used industrially only in a relatively narrow pH range. More especially, they can only be used at a pH above 5. Small amounts of acid as they always appear owing to hydrogen chloride being split off in the polymerization of vinyl chloride or vinylidene chloride make this type of emulsifier inactive. In contrast therewith, the emulsifying activity of the sodium salt of the sulpho-acetic acid lauryl ester is substantially not impaired even at a pH value below 5.

The tests, the results of which are shown in FIGURE 2 of the drawing, were carried out in order to estimate the hydrolyzability of some ester type emulsifiers under mild conditions. 0.1% solutions of various emulsifiers in 0.1 N and 0.5 N sodium hydroxide solutions were prepared and were kept at 20° and 40° C. respectively. Samples of the solutions were titrated in intervals of several hours using phenol phthalein as indicator to determine the progress of hydrolysis with the time.

The course of the hydrolysis during the first 400 minutes is illustrated in FIGURE 2 of the drawing. The curves show that after 300 minutes under the conditions specified above the known emulsifier sodium lauryl phthalate has been hydrolyzed in the optimum case to an extent of 50%, the likewise known sodium octyl phthalate to an extent of about 75%. Contrary thereto, an emulsifier of the invention, viz. the chloride of the dodecyl ester of triethyl ammonium acetic acid had been hydrolyzed to 100% already after 50 minutes. In order to substantially hydrolyze the last mentioned phthalic acid ester emulsifiers considerably stronger reaction conditions must be employed. Such conditions cannot, however, be observed without the polymer being impaired in the presence of alkali sensitive and heat sensitive polymers, such as polyvinyl chloride or polyvinylidene chloride, acrylonitrile or vinyl esters.

The emulsion polymerization processes in which the emulsifiers of the invention are useful are well known in the art and are described, e.g. in "Polyvinylchlorid und Vinylchlorid-Mischpolymer," by F. Kainer, Springer-Verlag, Berlin-Gottingen-Heidelberg (1951), pages 42 to 51; "Polymerisationskinetik," by L. Küchler, Springer-Verlag, Berlin-Gottingen-Heidelberg (1951), pages 151 to 160; and "Polymer Processes," by C. B. Schildknecht, Interscience Publishers Inc., New York (1956), pages 111 to 174. In emulsion polymerization processes the liquid monomer is emulsified in an aqueous phase, the extremely fine distribution of the monomer droplets being achieved by the addition of an emulsifying agent. Polymerization of the monomer occurs at the interface between these droplets and the aqueous phase under the action of a radical-forming polymerization catalyst. The most preferred products that can be manufactured by emulsion polymerization processes are the homo- and copolymers of vinyl chloride, vinylidene chloride, styrene, acrylic acid esters of alcohols having up to 18 carbon atoms, such as acrylic acid methyl-, ethyl-, propyl-, butyl- or octyl-esters, methacrylic esters of the same alcohols, acrylonitrile, vinyl esters of carboxylic acids having up to 18 carbon atoms, such as vinyl acetate, formate, propionate, or butyrate, and butadiene. These monomers are more particularly defined as vinyl monomers and vinylidene monomers respectively because they contain as a common feature either the vinyl group $CH_2═CH—$ or the vinylidene group $CH_2═C═$. The present invention is, however, not limited to the polymerization of a certain class of monomers.

The emulsifiers used in the process of this invention can be hydrolyzed after the polymerization at temperatures within the range of 5° C. to 60° C. and preferably between room temperature and about 50° C., which temperature ranges are especially advantageous from a technical point of view.

The emulsifiers of the invention are used in concentrations as are usual in the emulsion polymerization art. Concentrations from 0.1 to 5%, calculated on the monomer, are recommended, the percentages being by weight.

The polymerization may be initiated in usual manner with any initiator known in the art. Especially suitable are water-soluble radical-forming polymerization initiators of the peroxide type, such as hydrogen peroxide, peroxy acetic acid, and alkali and alkaline earth metal salts of peroxy sulfonic acid. If desired the peroxide polymerization initiator may be activated by the addition of heavy metal salts, such as water-soluble salts of iron or manganese, in an amount of 1 to 100 p.p.m. calculated on the monomer. Other suitable initiator systems which have the advantage of providing radicals at a comparably low temperature are the so-called redox systems such as about equimolecular amounts of potassium persulfate and formaldehyde sodium sulfoxylate (known as rongalite); hydrogen peroxide and rongalite; hydrogen peroxide, rongalite, and ferrous sulfate; sodium persulfate and sodium bisulfite; hydrogen peroxide and ferrous sulfate. The invention is, however, not limited to the use of a specific initiator system.

To carry out the process of the invention by modification of a conventional emulsion polymerization process, 1000 parts by weight of water, 100 to 1200 parts by weight of one or more of the monomers defined above, 1 to 60 parts by weight of a hydrolyzable emulsifier as defined herein, 0.1 to 3 parts by weight of a polymerization initiator, 1 to 120 parts by weight of an optional buffering agent such as mono- or disodium phosphate, if desired, and if necessary, a sufficient amount of acid to provide a pH value between 2 and 8 are admixed as a batch in a polymerization vessel and, if desired, are heated, preferably under pressure and while stirring, to an elevated temperature sufficiently high to cause polymerization. In case a redox system is used as the initiator, heating may often be omitted. In this case at most one of the components of said redox system is originally present in the batch and the other components are introduced during the course of the polymerization, e.g. during 1 to 10 hours, by increments or continuously. Of course, the monomer also can be introduced partially or completely during the course of the process. The temperature is maintained at a suitable value, e.g. in the range between room temperature and 80° C., that value depending on the character of the monomer and the initiator system used. The temperature is maintained during an appropriate period of time, e.g. 1 to 10 hours, while stirring is continued. If elevated pressures are used, a drop in pressure in the polymerization vessel is indicative of the completion of polymerization. Subsequently, the remaining pressure is released, the batch is allowed to cool, e.g. to ambient temperature, and a strong alkaline reagent is added to hydrolyze the emulsifier. A strong alkaline reagent suitable for imparting an alkaline pH value to the batch is, e.g., an alkali or alkaline earth metal hydroxide, such as sodium hydroxide, potassium hydroxide, lithium hydroxide, calcium hydroxide (e.g. in the form of milk of lime), strontium hydroxide, or barium hydroxide. An alkyl ammonium hydroxide is also suitable. Likewise suitable are alkali metal and alkaline earth metal salts of weak acids, e.g. the alkali metal carbonates or acetates. Preferably said strong alkaline reagent is added in the form of an aqueous solution. A "strong alkaline reagent" used for alkalizing the aqueous medium according to the invention is defined herein as an alkaline material imparting to this medium a pH value of at least 10. It is obvious that such an effect can be achieved using each of the alkalies mentioned hereinbefore, whereas it is impossible to achieve a pH value in the desired range by the addition of a so-called "weak alkali" such as ammonia.

After such addition, the pH value of the aqueous phase should generally be at least 10. In some cases, it is advantageous to heat the thus alkalinized aqueous medium to a moderate temperature, e.g. in the range between 30° C. and 55° C. in order to accelerate the hydrolysis of the emulsifier. By this alkaline treatment the ester linkage of the hydrolyzable emulsifier is hydrolyzed irreversibly, whereby the emulsifier is deprived of its emulsifying activity because the fractions obtained by hydrolysis have no surface active properties. The fractions obtained are either soluble in water or are compatible with the polymer so that the polymer does exhibit effects such as are produced by non-hydrolyzable emulsifiers.

Subsequent to this treatment, which usually lasts about 2 to 300 minutes, and which is often accompanied by a coagulation of the polymer emulsion, the polymer included in the alkalinized aqueous medium is processed further in the usual manner. It is advisable first to neutralize the aqueous medium by the addition of a strong acid such as hydrochloric acid, sulfuric acid, phosphoric acid, nitric acid, or an organic acid, e.g. a carboxylic acid such as formic acid, or an organic sulfonic acid such as benzene sulfonic acid or toluene sulfonic acid. The solid particles are then separated from the aqueous phase containing the fractions of the hydrolyzed emulsifier, e.g. by filtration or centrifuging, are washed in the usual manner, and dried if desired. In some cases it may be advantageous, before separating the polymer from the aqueous phase, to heat the aqueous phase comprising the polymer to a temperature below the softening point of the polymer in order to facilitate agglomeration. Of course the process of the invention can be carried out by any other methods useful for conducting an emulsion polymerization and is by no means limited to the particular method described in the foregoing paragraphs.

The process of this invention differs from known emulsion polymerization processes in that after the polymerization the pH value of the aqueous medium of the polymer emulsion or dispersion is changed, e.g. to a pH value above 8, preferably at least 10, which treatment involves decomposition of the hydrolyzable emulsifier to form non-surface active fractions. Moreover, the treatment involves inactivation of said emulsifier with the formation of cleavage products which can easily be removed by washing and do not impair the quality of the resulting polymer.

The alkaline hydrolysis of a typical emulsifier used in the invention, namely the chloride of the dodecyl ester of trimethyl ammonium acetic acid, is detectible by measurement of the surface tension of its 1% aqueous solution, for example, as is shown in the following Table 1.

For the tests, 1% aqueous solutions of the emulsifier at different pH values were prepared and stored for 2 hours in order to establish the hydrolysis equilibrium. Subsequently, the surface tension of the solution was measured using a stalagmometer according to Traube (cf. B. Firgensons, Organic Colloids, Elsevier Publishing Company, New York, 1958, page 68, or H. Römpp, Chemie Lexikon, Franckh'sche Verlagshandlung, Stuttgart, Germany, 1958, page 4167).

TABLE 1

| Solution: 1% emulsifier in— | pH | Surface tension (number of drops) |
|---|---|---|
| 0.5 N aqueous hydrochloric acid | 2 | 88 |
| 0.5 N aqueous $Na_2CO_3$-solution | 9–10 | 51–52 |
| 0.01 aqueous NaOH-solution | 12 | 48–49 |
| Pure water without dissolved emulsifier for comparison | 7 | 47–48 |

The following examples serve to illustrate the invention, but they are not intended to limit it thereto, the percentages and parts mentioned throughout the examples being by weight unless otherwise stated.

*Example* 1

A nitrogen-purged 40 l. autoclave was charged with a mixture consisting of 5 liters nitrogen-purged, distilled water,
24.5 g. dodecylester of the chloride of trimethyl ammonium acetic acid,
10 g. glacial acetic acid, and
2 g. rongalite.

The autoclave was heated to 48° C. while stirring by an anchor stirrer with a velocity of 75 revolutions/minute and the following three components were introduced simultaneously and continuously into the reaction medium.

Redox component A:

5 liters distilled water (purged with $N_2$),
24.5 g. dodecylester of the chloride of timethyl ammonium acetic acid,
21.5 cc. $H_2O_2$ of 35% strength, at a rate of 200 cc./10 minutes.

Redox component B:

5 liters distilled water (purged with $N_2$), 19 g. rongalite, at a rate of 200 cc./10 minutes.

Monomer mixture:

7.55 liters vinyl chloride, 1.2 kg. vinyl acetate, at a rate of 400 cc./10 minutes.

After about 4 hours and 10 minutes, the internal pressure in the vessel rapidly dropped by 1.5 to 2 atmospheres. At this moment, the reaction was interruped by degassing the reaction medium and the latex obtained was diluted to three times its volume with water. The emulsifier was hydrolyzed by adding dilute sodium hydroxide solution until the pH of the latex was 12. The precipitated copolymer was separated from the mother liquor with the aid of a centrifuge after the alkalinity had previously been neutralized by introducing carbon dioxide. The solid polymer obtained was suspended twice, thoroughly washed twice with water and finally dried. The yield amounted to 90% of the theoretical. The copolymer had a K-value of 49.7 in cyclohexanone and had good lacquer-forming properties as described below. In order to establish the superiority of this polymer as compared with polymers prepared with the use of conventional emulsifiers, the adhesiveness of polymer lacquers prepared according to various processes to an aluminium sheet was tested. The results are shown in the following Table 2. In this table polymer No. 1 is the product obtained according to the process described in the foregoing lines. Polymer No. 2 is a polymer obtained according to the same process but the alkali treatment of the batch after the polymerization and the subsequent neutralization are omitted. Polymer No. 3 is a polymer obtained according to an equal emulsion polymerization process but instead of the dodecylester of the chloride of trimethyl ammonium acetic acid a conventional emulsifier, namely a sodium alkyl sulphonate the alkyl chains of which have 12–18 carbon atoms is used. Polymer No. 4 is a copolymer of the same composition obtained by polymerization in an organic solvent. All polymers had an equal ratio of monomers, namely 87% vinyl chloride and 13% vinyl acetate and showed a K-value in the range between 49.7 and 51.

TABLE 2

| Polymer No. | Type of polymer | Color stability | Resistance to separation |
|---|---|---|---|
| (1) | Emulsion copolymer of vinylchloride/vinyl acetate 87:13 (emulsifier: Na-salt of trimethylammonium acetic acid dodecylester, hydrolyzed after polymerization). | Very good | 1.8–2.6 |
| (2) | Same as (1)—emulsifier not hydrolyzed. | Tends to discoloration. | 0.2–0.8 |
| (3) | Emulsion polymer of vinyl chloride/vinyl acetate 87:13 (emulsifier: alkylsulfonate—emulsifier not hydrolyzed). | Color changed slightly. | 0.2–0.4 |
| (4) | Solvent polymer of vinylchloride/vinyl acetate 87: 13. | Very good | 1.8–2.6 |

To estimate the resistance to separation shown in the last column of the table, 80% of the polymer admixed with 20% of a copolymer of vinyl chloride/vinyl acetate/maleic acid (86:13:1) was dissolved to a 10% solution in a mixture of 1:1 parts by volume of acetone and toluene and applied by means of a spraying gun to one side of an aluminium foil. After evaporation of the solvent by 10 minutes' heating to 60° C. and 12 hours' storing in the atmosphere, the coil was cut to strips 5 cm. wide. Two strips were sealed together with their coated faces by means of a household flat iron having a temperature of about 120° C. The unsealed ends of the two strips were drawn perpendicular to the planes of the aluminium foils with a velocity of 100 mm. per minute. The force needed to separate the sealed foils measured in kilograms is indicated in Table 2.

*Example 2*

The polymerization apparatus described in Example 1 was charged with 5 liters distilled, nitrogen-purged water, 24.5 g. sodium salt of the sulfoacetic acid dodecylester, 2 g. rongalite, and 10 g. glacial acetic acid.

The following three components were added uniformly and continuously while stirring (75 revolutions/minute) at a reaction temperature of 40° C.

Redox component A:

5 liters distilled, nitrogen-purged water, 24.5 g. sodium salt of the sulfoacetic acid dodecylester, 20.5 cc. $H_2O_2$ of 35% strength, at a rate of 200 cc./10 minutes.

Redox component B:

5 liters distilled, nitrogen-purged water, 18 g. rongalite, at a rate of 200 cc./10 minutes.

Monomer mixture:

7.55 liters vinyl chloride, 1.2 kg. vinyl acetate, at a rate of 400 cc./10 minutes.

After a pressure drop of 1.5 atmospheres in the reaction vessel, the polymerization was interrupted and the reaction mixture was processed in the manner described in Example 1. In this example, it took a little more time than in Example 1 to hydrolyze the emulsifier, i.e. 2 hours.

The copolymer finally obtained had a K-value of 47.8 in cyclohexanone.

The improvement of the heat resistance of copolymers of vinyl chloride/vinyl acetate 87:13 obtained according to various polymerization processes when milled at 140° C. with the addition of 0.5% of lead stearate is shown in the following Table 3. The types of polymers shown in this table are the same as in Table 2.

TABLE 3

| Polymer No. | Type of polymer | Heating period to cause discoloration (minutes) |
|---|---|---|
| (1) | Emulsion copolymer of vinyl-chloride/vinyl acetate 87:13 (emulsifier: Na-salt of trimethyl ammonium acetic acid dodecyl ester, hydrolyzed after polymerization). | More than 30. |
| (2) | Same as (1)—emulsifier not hydrolyzed. | Less than 5. |
| (3) | Emulsion polymer of vinyl chloride/vinyl acetate 87:13 (emulsifier: alkylsulfonate—emulsifier not hydrolyzed). | Less than 10. |
| (4) | Solvent polymer of vinyl-chloride/vinyl acetate 87:13. | More than 30. |

The table shows that the polymer obtained according to the invention (polymer No. 1) is comparable with a solvent polymer obtained by a far more expensive polymerization process (polymer No. 4) whereas a polymer obtained by an emulsion polymerization process with the use of a conventional emulsifier (polymer No. 2) is considerably inferior to solvent polymers.

*Example 3*

The apparatus described in Example 1 was charged under the conditions specified in that example with 5 liters distilled, nitrogen-purged water, 50 g. dodecylester of the chloride of trimethyl ammonium acetic acid, 2 cc. $H_2O_2$ of 35% strength.

The following three components were then introduced while stirring (75 revolutions/minute) at a reaction temperature of 50° C.

Redox component A:
- 5 liters distilled, nitrogen-purged water,
- 23.5 g. $H_2O_2$ of 35% strength,
- 80 g. itaconic acid, at a rate of 200 cc./10 minutes.

Redox component B:
- 5 liters distilled, nitrogen-purged water,
- 25 g. rongalite, at a rate of 200 cc./10 minutes.

Monomer mixture:
- 7.55 liters vinyl chloride,
- 1.2 kg. vinyl acetate, at a rate of 400 cc./10 minutes.

After about 4¼ hours, the pressure in the reaction vessel dropped rapidly by 1.5 atmospheres and the reaction was arrested.

The emulsifier was hydrolyzed in the manner described in Example 1 and the pH value of the reaction mixture was adjusted to 3 by adding dilute hydrochloric acid. The whole was then processed as described in Example 1.

The copolymer obtained, i.e. vinyl chloride/vinyl acetate and itaconic acid, had a K-value of 48.3 in cyclohexanone and very good lacquer-forming properties, especially a good adhesiveness on metal surfaces (cf. Table 2).

*Example 4*

In the manner described in Example 3 a copolymer was prepared from vinyl chloride, vinyl acetate and maleic acid in the ratio of 86:13:1. The product obtained had similarly good properties as the copolymer of Example 3.

*Example 5*

A 50 liter autoclave thoroughly purged with nitrogen was charged with

- 11 liters distilled, nitrogen-purged water,
- 110 g. sodium salt of the sulfoacetic acid lauryl ester,
- 15 g. potassium persulfate in 6 liters nitrogen-purged distilled water,
- 10 kg. vinyl chloride.

The reaction medium and the catalyst solution were introduced into the autoclave, the autoclave was closed and thoroughly evacuated three times, and purged with nitrogen. After about 3 hours—reaction temperature: 50° C; velocity of stirrer: 75 revolutions/minute—the pressure dropped by about 1.5 atmospheres. About 85% of the material had undergone polymerization.

The reaction mixture was diluted with water to three times its volume, adjusted to a pH value of 12 by adding dilute sodium hydroxide solution whereby the emulsifier was hydrolyzed within about 1.5 to 2 hours. The alkalinity of the reaction mixture was neutralized by means of carbon dioxide and the whole was processed in the manner described in Example 1.

Very pure polyvinyl chloride having a K-value of 69.2 in cyclohexanone was obtained.

The product had an ash content of less than 0.1%, and is was very stable to heat after the addition of 1.5% barium-cadmium laurate and 1% sliding wax.

The electrical values of specimens prepared from the above polyvinyl chloride were within the range of values of comparable polyvinyl chloride obtained by suspension polymerization.

*Example 6*

A 50 liter autoclave was charged as described in Example 5 with 25 liters nitrogen-purged, distilled water and 7.5 kg. potassium persulfate. After thorough evacuation, which was repeated three times, 13.3 liters vinyl chloride were added. The autoclave was heated to 50° C. while stirring (75 revolutions per minute). 3 hours after reaching that temperature, 240 cc. per hour of a 5% aqueous solution of the sodium salt of the sulfoacetic acid dodecylester were introduced continuously by means of a dosing pump until the pressure in the autoclave commenced to drop. The polymerization was substantially complete after about 10 to 12 hours.

The emulsifier was hydrolyzed and the reaction mixture processed in the manner described in Example 5.

The polyvinyl chloride obtained had primary particles of a size of 0.4 to 0.6 $\mu$. The product exhibits interalia very good electrical values. It was admixed with a plasticizer in a ratio of 60:40 and then used as PVC paste.

As compared with comparable commercial products, the product of this invention was distinguished by its extreme purity and good heat stability.

What is claimed is:

1. In an aqueous emulsion polymerization process comprising agitating a mixture of an ethylenically unsaturated monomer, water, an emulsifier, and a radical-forming polymerization initiator, said mixture having a pH between 2 and 8, and subsequently separating the polymer product formed from the aqueous phase, the improvement comprising the steps of (A) using as the emulsifier a compound of the formula $$X—(CH_2)_n—CO—O—R$$

wherein X is a member selected from the group consisting of the sulfonic acid group, the phosphonic acid group, alkali metal salts of said acid groups, and a trialkyl ammonium halide radical the alkyl groups of which have up to 6 carbon atoms each, R is an aliphatic hydrocarbon radical having 6 to 25 carbon atoms, and *n* is an integer from 1 to 2, and (B) decomposing the emulsifier by hydrolysis by raising the pH of the aqueous emulsion to at least 10 prior to separating the polymer product formed from the aqueous phase.

2. The process as in claim 1 wherein step (B) is carried out at a temperature between 5° and 60° C.

3. The process as in claim 1 wherein radical R has 8 to 14 carbon atoms.

4. The process as in claim 1 wherein said ethylenically unsaturated monomer is a vinyl monomer.

5. The process as in claim 1 wherein said ethylenically unsaturated monomer is a vinylidene monomer.

6. The process as in claim 1 wherein said ethylenically unsaturated monomer is at least one member selected from the group consisting of vinyl chloride, vinylidene chloride, styrene, itaconic acid, maleic acid, acrylic and methacrylic esters of an alcohol having up to 18 carbon atoms, and a vinyl ester of a carboxylic acid having up to 18 carbon atoms.

7. The process as in claim 1 wherein said ethylenically unsaturated monomer is vinyl chloride.

8. The process as in claim 1 wherein said ethylenically unsaturated monomer comprises vinyl chloride and vinyl acetate.

9. The process as in claim 1 wherein said emulsifier is the chloride of a trialkyl ammonium acetic acid ester of an alcohol having 6 to 25 carbon atoms.

10. The process as in claim 1 wherein said emulsifier is an alkali metal salt of an ester of phosphoacetic acid and an aliphatic alcohol having 6 to 25 carbon atoms.

11. The process as in claim 1 wherein said emulsifier is an alkali metal salt of an ester of sulfoacetic acid and an aliphatic alcohol having 6 to 25 carbon atoms.

References Cited by the Examiner

UNITED STATES PATENTS 2,787,604 4/57 Miller .............. 260—92.8

FOREIGN PATENTS 620,314 5/61 Canada.

OTHER REFERENCES

Moillet et al., Surface Activity, pages 268–9, 1st ed., D. Van Nostrand (N.Y.), 1951.

LEON J. BERCOVITZ, *Primary Examiner.*

LOUISE P. QUAST, J. R. LIBERMAN, *Examiners.*